United States Patent [19]

Anderson

[11] Patent Number: 4,699,235
[45] Date of Patent: Oct. 13, 1987

[54] LINEAR ACTUATOR CONTROL SYSTEM FOR SPLIT AXLE DRIVE MECHANISM

[75] Inventor: James L. Anderson, Brighton, Mich.
[73] Assignee: General Motors Corporation, Detroit, Mich.
[21] Appl. No.: 843,012
[22] Filed: Mar. 24, 1986
[51] Int. Cl.[4] .............................................. B60K 17/34
[52] U.S. Cl. .................................. 180/247; 74/710.5; 60/527; 192/48.7; 192/87.11
[58] Field of Search ........................ 180/247; 74/710.5; 192/48.7, 49, 85 C, 87.1, 87.11; 60/527

[56] References Cited

U.S. PATENT DOCUMENTS

| Re. 28,545 | 9/1975 | Harris | 399/45 R |
|---|---|---|---|
| 3,123,169 | 3/1964 | Young et al. | 180/233 |
| 3,664,698 | 5/1972 | Stropkay | 292/201 |
| 3,756,083 | 9/1973 | Tatsutomi et al. | 60/527 X |
| 3,782,121 | 1/1974 | Marcoux | 60/527 |
| 3,784,958 | 1/1974 | Harris | 339/45 R |
| 3,805,528 | 4/1974 | Huebscher | 60/530 |
| 3,886,513 | 5/1975 | Smith et al. | 337/315 |
| 3,991,572 | 11/1976 | Huebscher et al. | 160/531 |
| 4,016,722 | 4/1977 | Niederer | 60/531 |
| 4,029,941 | 6/1977 | Huebscher et al. | 160/531 X |
| 4,044,348 | 8/1977 | Huebscher | 340/227.1 |
| 4,070,859 | 1/1978 | Sobecks | 60/530 |
| 4,070,946 | 1/1978 | Sandvik et al. | 91/25 |
| 4,079,589 | 3/1978 | Birli | 60/530 |
| 4,080,992 | 3/1978 | Niederer | 137/636 |
| 4,095,427 | 6/1978 | Stropkay | 60/530 |
| 4,102,213 | 7/1978 | Smith | 74/110 |
| 4,104,507 | 8/1978 | Tisone et al. | 219/513 |
| 4,271,722 | 6/1981 | Campbell | 74/710.5 |
| 4,341,281 | 7/1982 | Nagy | 180/247 |
| 4,373,604 | 2/1983 | Lunn et al. | 180/247 |
| 4,381,828 | 5/1983 | Lunn et al. | 180/247 |
| 4,407,387 | 10/1983 | Linderbert | 180/247 |
| 4,452,331 | 6/1984 | Lunn et al. | 180/247 |

Primary Examiner—John A. Pekar
Attorney, Agent, or Firm—F. J. Fodale

[57] ABSTRACT

A control system for automatically operating the clutch in a single clutch split axle mechanism responsive to an operational mode of a transfer case in a part-time four-wheel drive vehicle comprises an electro-thermal linear actuator mounted on the split axle mechanism for actuating the clutch and an electric switch mounted on the transfer case for controlling the electro-thermal linear actuator responsive to the operational mode of the transfer case. The electro-thermal linear actuator includes a time delay means so that four-wheel drive can be selected while the vehicle is in motion.

3 Claims, 6 Drawing Figures

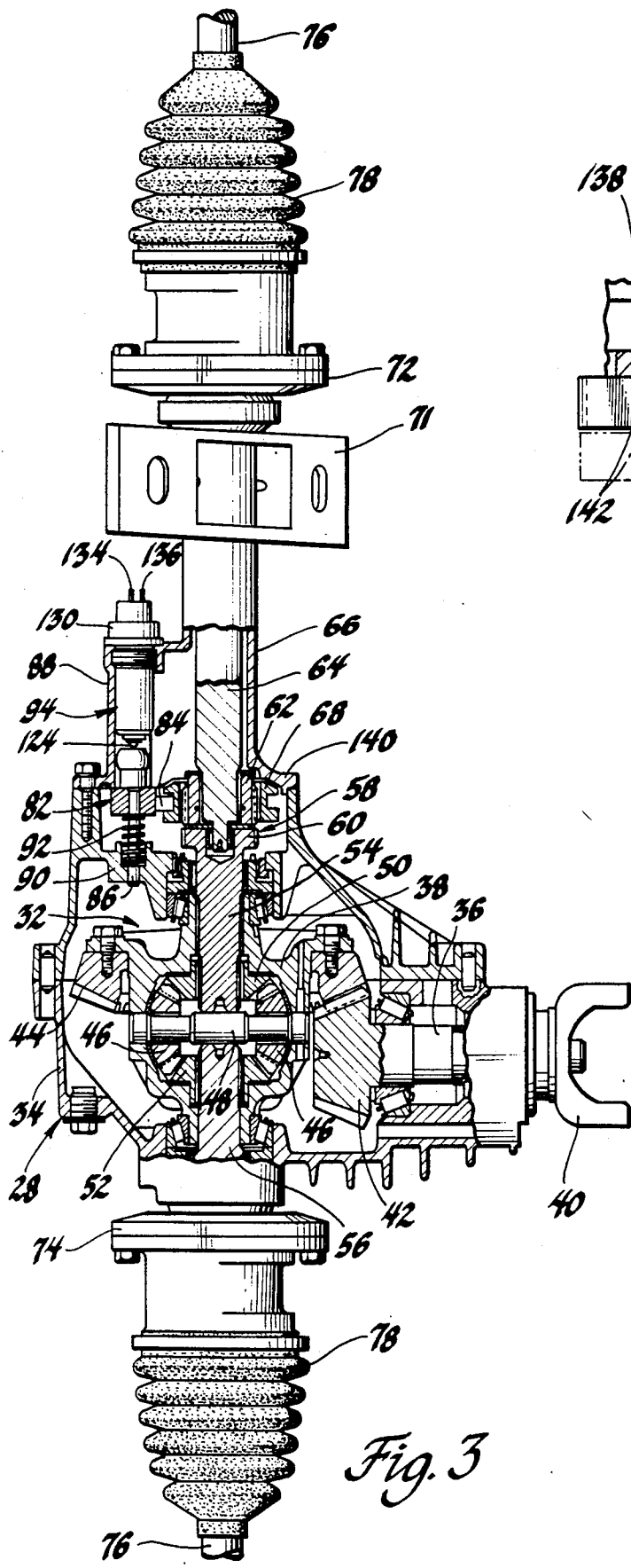
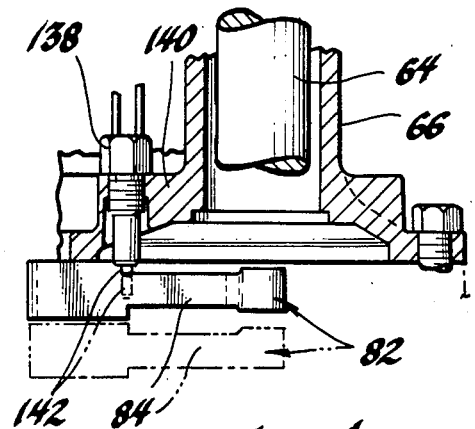
Fig. 4
Fig. 3

LINEAR ACTUATOR CONTROL SYSTEM FOR SPLIT AXLE DRIVE MECHANISM

This invention relates generally to a split axle drive mechanism such as disclosed in U.S. Pat. No. 4,341,281 granted to Laszlo Nagy, July 27, 1982 and more particularly, to a control system for such a split axle drive mechanism.

U.S. Pat. No. 4,407,387 (now U.S. Pat. Re. No. 31,981) granted to Brook Lindbert Oct. 4, 1983 discloses a control system for a split axle drive mechanism which has been used in General Motors production vehicles successfully for the past few years.

The object of this invention is to provide an improved control system.

A feature of the invention is that the control system has a fewer number of components than the electro-pneumatic control system which is illustrated in the Lindbert patent and the all pneumatic system which is used in GM production vehicles.

Another feature of the invention is that the control system utilizes an electrically energized, linear actuator which is mounted on the split axle drive mechanism to operate the shift fork which engages and disengages the clutch of the split axle drive mechanism. This results in a control system which is very compact and greatly simplified.

Another feature of the invention is that the control system utilizes an electrically energized, thermal linear actuator which operates on a phase change principle and provides a time delay for shift-on-the-fly operation of the split axle drive mechanism.

Another feature of the invention is that the control system utilizes an electrically energized, thermal linear motor which provides a cushioned engagement for the clutch during shift-on-the-fly operation of the split axle drive mechanism.

Another feature of the invention is that the control system relies solely on an electrical energy source and eliminates any need for a vacuum energy source thereby utilizing a more consistent and reliable energy source.

Still yet another feature of the invention is that the control system eliminates any need for mechanical push-pull cables and pneumatic lines which are difficult to route from the transfer case to the split axle drive mechanism via the engine compartment.

Still yet another feature of the invention is that the control system is greatly simplified in terms of the number of components in that the components consist essentially of an electro-thermal linear actuator, an electrical switch and electrical conductors to connect the actuator and switch in series with an electrical power source.

Still yet another feature of the invention is that two major components of the control system, the actuator and the switch, are themselves part of major assemblies of the vehicle, and consequently, the control system is easily assembled into the vehicle. Other objects and features of the invention will become apparent to those skilled in the art as the disclosure is made in the following detailed description of a preferred embodiment of the invention as illustrated in the accompanying sheets of drawing in which:

FIG. 3 is a longitudinal section of the split axle drive mechanism taken substantially along the line 3—3 of FIG. 2 looking in the direction of the arrows.

FIG. 4 is a fragmentary longitudinal section of the split axle drive mechanism taken substantially along the line 4—4 of FIG. 2 looking in the direction of the arrows.

Figure 1:
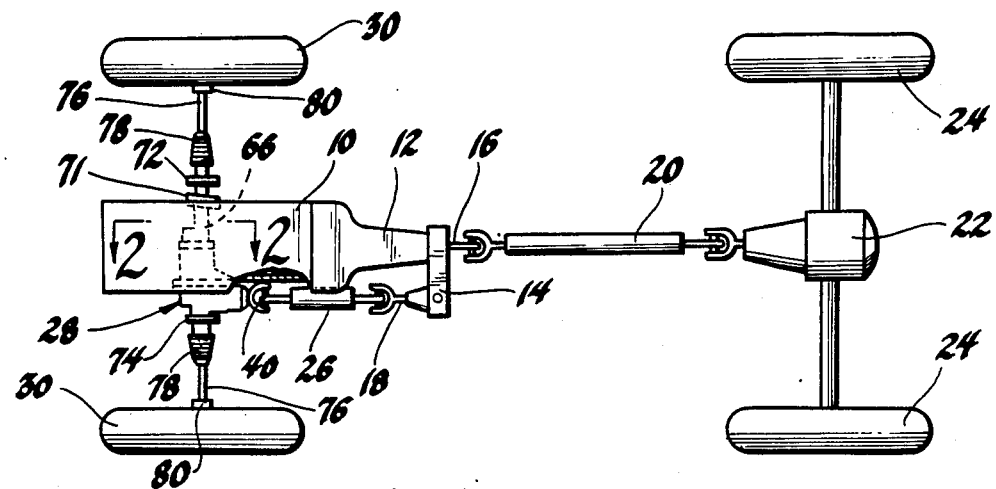
FIG. 1 is a schematic plan view of a part-time four-wheel drive vehicle having a split axle drive mechanism and a control system for operating the clutch thereof in accordance with my invention.

Referring now to the drawing and more particularly to FIG. 1, there is shown a schematic plan view of a part-time four-wheel drive vehicle, comprising an internal combustion engine 10, transmission 12 and transfer case 14 mounted on a vehicle chassis (not shown). The engine 10 and transmission 12 are well-known components as is the transfer case 14 which typically has an input shaft (not shown), a main output shaft 16 and an auxiliary output shaft 18. The main output shaft 16 is drive connected to the input shaft in the transfer case 14 and is customarily aligned with it. The auxiliary output shaft 18 is drive connectable to the input shaft by a clutch or the like in the transfer case 14 and customarily offset from it. The transfer case clutch is actuated by a suitable selector mechanism (not shown) which is generally remotely controlled by the vehicle driver.

The main output shaft 16 is drivingly connected to a rear propeller shaft 20 which in turn is drivingly connected to a rear differential 22. The rear differential 22 drives the rear wheels 24 through split axle parts in a well-known manner.

The auxiliary output shaft 18 is drivingly connected to a front propeller shaft 26 which in turn is drivingly connected to a split axle drive mechanism 28 for selectively driving the front wheels 30 through split axle parts.

The Split Axle Drive Mechanism

As shown in FIGS. 2 through 6, the split axle drive mechanism 28 includes an automotive type differential 32 inside a housing 34. The differential 32 has a drive shaft 36 and a differential case 38 rotatably mounted in the housing 34 on orthogonally relaxed axes. The drive shaft 36 is the differential input and has an external yoke 40 at one end for universally coupling the drive shaft 36 to the front propeller shaft 26. The internal end of the drive shaft 36 has an integral driving pinion 42 which meshes with a ring gear 44 attached to the differential case 38. The differential case 38 carries a plurality of rotatable pinion gears 46 mounted on a cross pin 48. The pinion gears 46 mesh with side gears 50 and 52 which are splined to the end of the stub shafts 54 and 56 respectively. The stub shafts 54 and 56 are rotatably mounted in the housing 34 on the differential case axis. These stub shafts are rotatable relative to each other and to the differential case.

Figure 6:
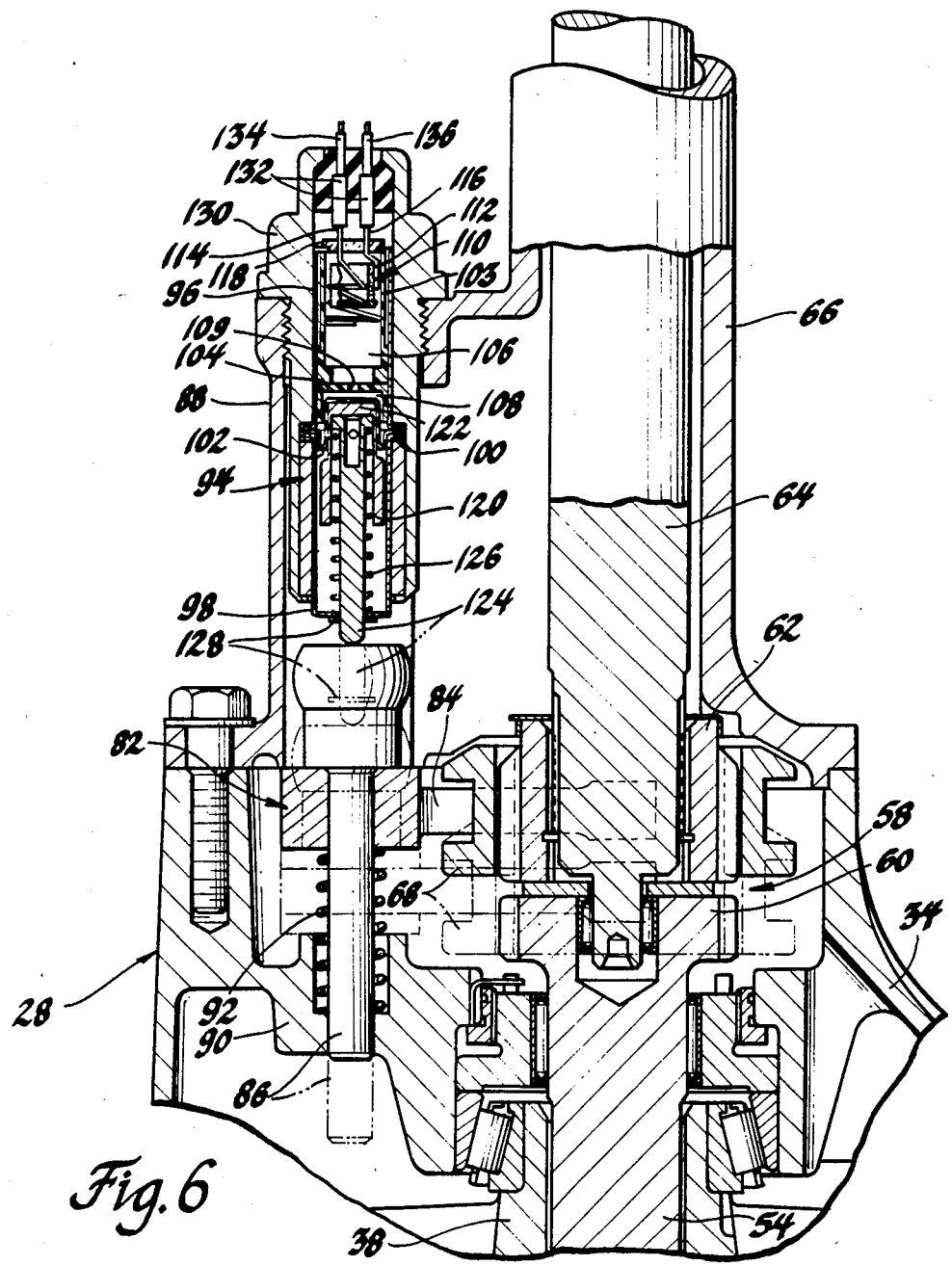
FIG. 6 is an enlargement of a portion of FIG. 4 showing details of the linear actuator.

The split drive axle mechanism 28 further includes a positive clutch 58 which changes the mode of operation of the differential 32 and makes it particularly useful for the selectively driven wheels in a part-time four-wheel drive vehicle. As shown in FIGS. 3 and 6, the clutch 58 comprises an integral spline wheel 60 at the outer end of the stub shaft 54 and a matching spline wheel 62 attached to the inner end of an extension shaft 64. The extension shaft 64 has its inner end journalled in the hollow outer end of the stub shaft 54 and its outer end journalled in a bearing (not shown) at the remote end of an extension tube 66 attached to the housing 34.

The clutch 58 further includes an internally splined sleeve 68 which is slideably mounted on the spline wheel 62. The splined sleeve 68 is shiftable between a disengaged position (shown in solid lines in FIGS. 3 and 6) and an engaged position (shown in phantom lines in FIG. 6) where it couples the spline wheels 60 and 62.

The split axle drive mechanism 28 is attached to the vehicle chassis by means of a housing bracket 70 and a bracket 71 on the extension tube 66.

The split axle drive mechanism 28 has two outputs for the respective split axle parts associated with the respective front wheels 30. One output is the stub shaft 54, clutch 58 and extension shaft 64 which has an external flange 72 for attaching one of the split axle parts. The other output is the stub shaft 56 which has an external flange 74 for attaching the other split axle part.

Suitable split axle parts, commonly referred to as half shafts, are well-known from front wheel drive automobiles. These may be used for connecting the split axle drive mechanism 28 to the front wheels 30. The drawings schematically illustrate a common type of half shaft for driving connection to independently suspended steerable vehicle wheels comprising an axle shaft 76 having a plunging universal joint 78 at its inboard end adapted for connection to an output such as the flange 72 or 74 and the well-known Rzeppa-type universal joint 80 at its outboard end adapted to be connected to the vehicle wheel 30.

The split axle drive mechanism 28 also includes a shifter 82 for operating the clutch 58. The shifter 82 as shown in FIGS. 2, 3, 4 and 6 comprises a fork 84 which is mounted on a slide pin 86 and which has tines engaged in an external groove of the splined sleeve 68. The fork 84 has an annular base which is disposed on the shank of the slide pin 86 against a head of the slide pin which slides in a siamese portion 88 of the extension tube 66. The opposite end of the slide pin shank is slideably disposed in a bore of a support wall 90 in the housing 34. A coil spring 92 which is disposed around the shank of the slide pin 86 engages the support wall 90 and the annular base of the fork 84 to bias the fork 84 and the splined sleeve 68 to the disengaged position which is shown in solid lines in Figures 3 and 6. The clutch 58 is engaged by a linear actuator 94 which engages the head of the slide pin 86 and when activated, moves the slide pin 86 and fork 84 from the solid line position shown in FIGS. 3 and 6 against the bias of the coil spring 92 so that the splined sleeve 68 slides into engagement with the spline wheel 60 as shown in phantom in FIG. 6. The clutch 58 is disengaged by deactivating the linear actuator 94 and returning the slide pin 86 and fork 84 to the solid line position shown in FIGS. 3 and 6 under the action of the coil spring 92.

The Linear Actuator

The linear actuator 94 is of the electro-thermal type which is a well known device which converts electrical energy into a relatively long mechanical stroke by boiling a liquid with an electrical heater and building up a pressure in an expansion chamber which acts on a piston to produce the stroke.

More specifically, the electro-thermal linear actuator 94 comprises a heater can 96 and a cylinder can 98 having confronting flanges which are secured by a crimp ring 100 to clamp and seal the periphery of a rolling diaphragm 102 comprising, for instance, a layer of synthetic rubber on a strong fabric. The heater can 96 and rolling diaphragm 102 define a chamber which holds an insulation sleeve 103 and a cup-shaped barrier 104, both of which are made of high temperature plastic. The cup-shaped barrier 104 is press fit in the heater can 96 and divides the chamber into a fixed volume heater chamber 106 and an expansion chamber 108 which communicate with each other via an orifice 109 through the bottom or radial wall of the cup-shaped barrier 104.

The heater chamber 106 contains a heater 110 and is filled with a thermally expansible and contractible pressure transmitting fluid (not shown for clarity) capable of undergoing a liquid-gas phase change upon heating, such as a fluorinated hydrocarbon, a fluorocarbon, an alcohol or other electrically non-conductive fluid of similar properties. The heater 110 itself comprises an electrically conductive ceramic sleeve 112 which is supported and powered by inner and outer electrodes 114, 116 which extend through a glass seal 118 at the end of the heater can 96 to provide electrical terminals for energizing the heater 110. The electrically conductive ceramic sleeve 112 is made of a positive temperature coefficient material, such as a doped barium titanate or the like to provide a positive temperature coefficient or PTC thermistor which reaches a self regulating anomaly or "Curie" temperature above the phase change temperature of the working fluid in chamber 106 very quickly after the electrodes 114, 116 are energized.

The cylinder can 98 holds a sliding hollow piston 120 which has a hat-shaped head 122. The rolling diaphragm 102 engages the top of the hat-shaped head 122 and lies against the side wall of the hat-shaped head 122 to form a convolution which rolls along the side wall as the piston 120 slides back and forth in the cylinder can 98. The hollow piston 120 carries a piston rod 124 which protrudes out the end wall of the cylinder can 98. The piston rod 124 is extended by the diaphragm 102 as explained below and retracted by a coil spring 126 inside the cylinder can 98. The retraction of the piston rod 124 is limited by a retaining ring 128 secured to the end of the piston rod.

The linear actuator 94 is secured in a housing 130 which is fastened in the siamese portion 88 of the extension tube 66 so that the end of the piston rod 124 engages the head of the slide pin 86 as shown in FIGS. 3 and 6. The external end of the housing 130 has an electrical connector 132 attached to the terminals of the heater 110 for connecting the heater 110 of the linear actuator 94 to an electrical power source via the electrical conductor leads 134, 136 which extends through a seal at the external end of the housing 130.

The PTC heater 110 is energized via the electrical conductor leads 134, 136 and the PTC heater 110 quickly reaches its "Curie" temperature and heats the working fluid which is in liquid form in the heater chamber 106. Some of this liquid, particularly the liquid in direct surface contact with the sleeve 112, boils or vaporizes which increases the pressure of the working fluid and forces a portion of the working fluid which is still in the liquid state through the orifice 109 of the cup-shaped barrier 104 into the expansion chamber 108. The liquid displaced through the orifice 109 of the barrier 104 pushes against the rolling diaphragm 102 forcing the diaphragm 102, the piston 120 and the piston rod 124, against the action of the coil spring 126. The maximum extension of the piston rod 124 is limited by the piston 120 engaging the end wall of the end cap 98. However, the operative extension of the piston rod 124 for engaging the clutch 58 as shown in phantom lines in FIG. 6 is preferably less the maximum extension. When the PTC heater 110 is deenergized, the PTC heater 110 and the working fluid in the heater chamber 106 cool down condensing the vapor portion of the working fluid. As the vapor portion condenses the pressure of the working fluid in the heater chamber 106 decreases and the rolling diaphragm 102, piston 120 and piston rod 124 move under the action of coil spring 126 forcing liquid in the expansion chamber 108 to return to the heater chamber 106 via the orifice 109 until the piston rod 124 is completely retracted by the coil spring 126.

The Indicator

Figure 2:
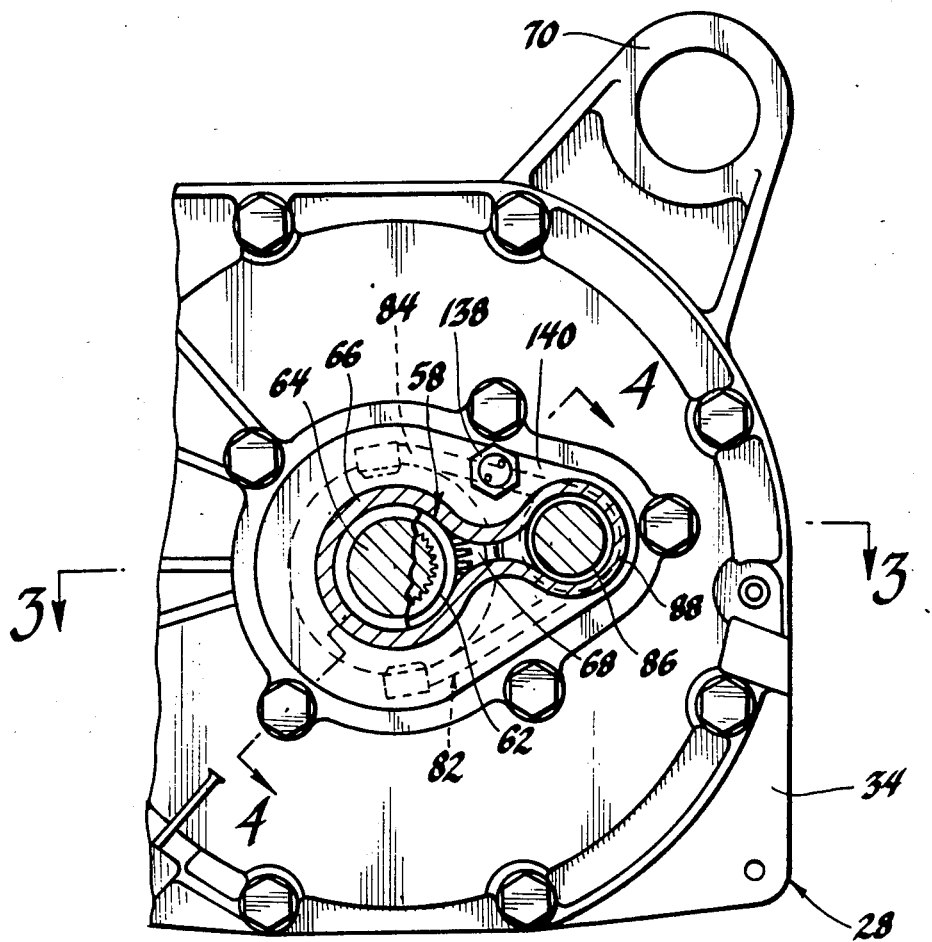
FIG. 2 is a transverse section of the split axle mechanism taken substantially along the line 2—2 of FIG. 1 looking in the direction of the arrows.

The split axle drive mechanism 28 may also include an indicator for indicating the operative condition of the clutch 58. In this instance, the split axle drive mechanism 28 includes a plunger operated electrical switch 138 which is mounted on the attachment flange 140 of the extension tube 66 as shown in FIGS. 2 and 4. The plunger operated electrical switch 138 is mounted near the linear actuator 94 so that the shift fork 84 engages the plunger 142 of the electrical switch 138 and depresses the plunger 142 to open the electrical switch 138 when the clutch 58 is in the disengaged position, shown in solid lines in FIG. 4. When the clutch 58 is in the engaged position, that is, the position shown in phantom in FIG. 4, the plunger 142 is released and the electrical switch 138 is closed.

The Control System

Figure 5:
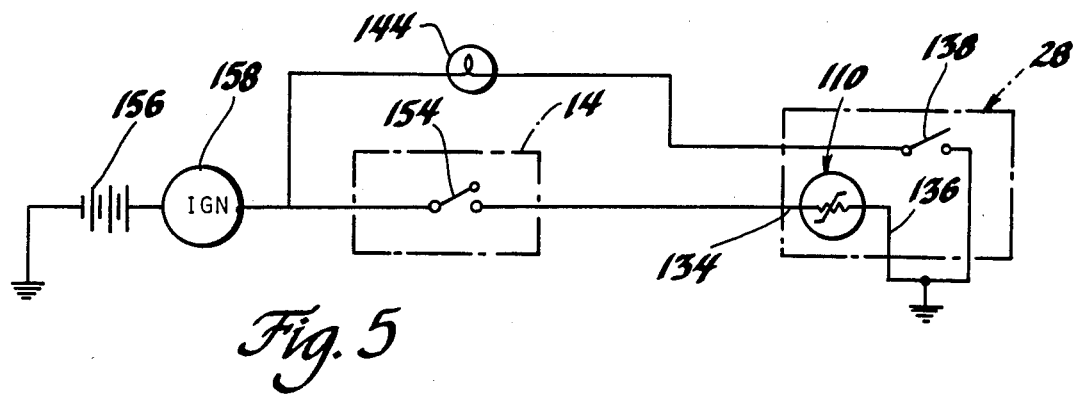
FIG. 5 is a schematic view of the control system, components of which are shown in detail in the other Figures.

The control system for operating the clutch 58 is shown schematically in FIG. 5. The control system consists essentially of the electro-thermal linear actuator 94 which is part of the split axle drive mechanism 28, an electrical switch 154 which is part of the transfer case 14 and electrical conductors which are easily assembled into the vehicle to connect the electro-thermal linear actuator 94 and electrical switch 154 in series with the vehicle battery or other electrical power source. The control system may also include the indicator described above and other comparable secondary features.

By way of background, transfer cases for part-time four-wheel drive vehicles commonly include an electric switch which is closed when the transfer case is in the four-wheel drive mode. The closed switch completes a circuit to an indicator light on the vehicle instrument panel to advise the vehicle driver that the vehicle is in the four-wheel drive mode. See for instance, U.S. Pat. No. 3,283,298 issued to Edgar F. Kaiser on Nov. 1, 1966.

FIG. 5 schematically illustrates the transfer case 14 having an electrical switch 154, it being understood that the electrical switch 154 is operatively connected with the transfer case 14 so that the electrical switch 154 opens when the transfer case 14 is in the two-wheel drive mode and closes when the transfer case 14 is in the four-wheel drive mode.

The electrical switch 154, as indicated above, controls the electro-thermal linear actuator 94 which operates the shifter 82 which in turn operates the clutch 58 and a second electrical switch 138 in the split axle drive mechanism 28 which controls the indicator light 144. More specifically, the electrical switch 154 is connected in series with the vehicle battery 156, the vehicle ignition switch 158 and the electrodes 114, 116 of the PTC heater 110 of the electro-thermal linear actuator 94 so that the PTC heater 110 is energized when the vehicle is operating and the transfer case 14 is in the four-wheel drive mode and deenergized when the transfer case 14 is in the two-wheel drive mode. As indicated above, energization of the PTC heater 110 vaporizes part of the working fluid in chamber 106 and extends the piston rod 124 of the electro-thermal linear actuator 94 which in turn moves the shifter 82 to engage the clutch 58 as shown in phantom lines in FIG. 6. This movement of the shifter 82 to the clutch engaged position releases the depressed plunger 142 of the electrical switch 138 as shown in FIG. 4. Extension of the plunger 142 closes the electrical switch 138 which, as shown schematically in FIG. 5, is connected in series with the indicator light 144 in a branch circuit which is in series with the vehicle battery 156 and the vehicle ignition switch 158 and which is parallel to a branch circuit containing the electrical switch 154.connected in series with the PTC heater 110 of the electro-thermal linear actuator 94. When the electrical switch 138 is closed, the indicator light 144 is turned on signaling that the clutch 58 of the split axle drive mechanism 28 has been engaged and that the vehicle is in four-wheel drive.

Operation

The two-wheel drive mode is illustrated in FIGS. 3, 5 and 6. In this mode, the drive to the auxiliary output shaft 18 is disconnected in the transfer case 14 and consequently, the electrical switch 154 is open. The PTC heater 110 is deenergized, the piston rod 124 is held in its retracted position by the spring 126, and the shifter 82 is held in a clutch disengaged position by the spring 92 as shown in solid lines in FIGS. 3 and 6. The plunger 142 of the electrical switch 138 is depressed as shown in FIG. 4 and the indicator light 144 is off.

When the vehicle is driven in the two-wheel drive mode, the lower wheel 30 shown in FIG. 1 back drives the differential side gear 52 but the upper wheel 30 does not back drive the differential side gear 50 because the clutch 58 is disengaged. Since the side gear 50 does not have any load, the side gear 52 merely counter-rotates the side gear 50 through the pinion gears 46. Hence, there is no back drive to the differential case 38, drive shaft 36 (differential input), front propeller shaft 26, auxiliary output shaft 18 and other transfer case components connected to the auxiliary output shaft 18 ahead of the disconnect in the transfer case 14. This mode of operation eliminates the major portion of wear and power consumption which would result from back drive of both wheels 30.

When the four-wheel drive mode is selected by the vehicle operator, the auxiliary output shaft 18 is drive connected to the input shaft in the transfer case 14 and the switch 154 is closed, setting off two chains of events which result in the clutch 58 automatically being engaged.

The transfer case output shaft 18 now drives the drive shaft 36 (differential input) and the differential case 38. The driven or rotating differential case 38 in turn reverses the counter-rotating side gear 50 so that the side gear 50 and stub shaft 54 rotate in the same direction as the side gear 52 and the extension shaft 64 which are driven by the respective front vehicle wheels 30. In time, the driven differential case 38 tends to synchronize the speeds of the stub shaft 54 and the extension shaft 64.

In the meantime, the closed electrical switch 154 energizes the PTC heater 110 of the electro-thermal linear actuator 94 heating and vaporizing part of the liquid working fluid in the heating chamber 106 to create a pressure acting on the diaphragm 102 which creates a force to extend the piston rod 124 against the action of coil spring 126 as described above. As the pressure builds up, the piston rod 124 extends pushing the shifter 82 and the splined sleeve 68 toward the clutch engaged position. Eventually the pressure is sufficient to overcome coil spring 126 as well as the coil spring 92 retaining the shifter 82 in the clutch disengaged position. The clutch 58 is then automatically engaged under the action of the electro-thermal actuator 94 when the respective splines of the substantially synchronized splined sleeve 68 and spline wheel 60 are aligned. When the clutch 58 is engaged, as shown in phantom in FIG. 6, both front wheels 30 are driven and the split axle drive mechanism 28 acts as a conventional differential.

The electro-thermal linear actuator 94 inherently provides a time delay on the order of a few seconds between the time that the PTC heater 110 is energized and sufficient pressure is built up to extend the piston rod 124 for clutch engagement. Of course, the time delay can be adjusted by changing any of several factors including but not limited to the heater type and design, the selection of working fluid, the use and design of a barrier and the selection of internal and external spring forces.

In any event, the time delay of electro-thermal actuator 94 must be enough so that rotation of the counter-rotating side gear 50 is reversed and the splined sleeve 68 is rotating in the same direction as the spline wheel 60 before any substantial clutch engage force is produced by the electro-thermal linear actuator 94. This time delay feature permits the vehicle operator to shift the transfer case 14 from two-wheel drive to four-wheel drive while the vehicle is in motion.

The clutch 58 is also automatically disengaged when the vehicle is returned to the two-wheel drive mode. When the two-wheel drive mode is selected at the transfer case 14, the electrical switch opens deenergizing the PTC heater 110 of the electro-thermal linear actuator 94 cooling and condensing the partially vaporized working fluid in the heating chamber 106 to decrease the pressure acting on the diaphragm 102. As the pressure decreases, the piston rod 124 retracts allowing the shifter 82 to move toward the clutch disengaged position. Eventually the pressure is diminished to the point where the force of the coil springs 126 and 92 are sufficient to overcome the pressure of the working fluid and the torque loading between the spline wheel 60 and the splined sleeve 68 whereupon the clutch 58 is automatically disengaged. When the clutch 58 is disengaged, there is not any back drive to the differential case 38 as indicated earlier.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A control system for automatically operating the clutch in a single clutch split axle mechanism responsive to an operational mode of a transfer case, with which the split axle mechanism is used in a part-time four-wheel drive vehicle comprising:
   a linear actuator mounted on the split axle mechanism and operatively connected to the clutch so that the clutch is biased toward disengagement when a first power means is fed to the linear actuator and biased toward engagement when a second power means is fed to the linear actuator,
   a switch operatively associated with the transfer case so that the switch has a first operative position where the first power means is fed to the linear actuator when the transfer case is in a two-wheel drive mode and a second operative position where the second power means is fed to the linear actuator when the transfer case is in a four-wheel drive mode, and
   said linear actuator having time delay means for delaying clutch engagement to a time after the transfer case is shifted to four-wheel drive and the second power means is fed to the linear actuator, so that the clutch parts are rotating in the same direction and four-wheel drive can be selected while the vehicle is in motion.

2. A control system for automatically operating the clutch in a single clutch split axle mechanism responsive to an operational mode of a transfer case, with which the split axle mechanism is used in a part-time four-wheel drive vehicle comprising:
   an electrical linear actuator mounted on the split axle mechanism and operatively connected to the clutch so that the clutch is biased toward disengagement when a first electric power means is fed to the linear actuator and biased toward engagement when a second electric power means is fed to the linear actuator,
   an electric switch mounted on the transfer case and operatively associated with the transfer case so that the switch has a first operative position where the first electric power means is fed to the electrical linear actuator when the transfer case is in a two-wheel drive mode and a second operative position where the second electric power means is fed to the electrical linear actuator when the transfer case is in a four-wheel drive mode, and
   said electrical linear actuator having time delay means for delaying clutch engagement to a time after the transfer case is shifted to four-wheel drive and the second electric power means is fed to the electric linear actuator, so that the clutch parts are rotating in the same direction and four-wheel drive can be selected while the vehicle is in motion.

3. A control system for automatically operating the clutch in a single clutch split axle mechanism responsive to an operational mode of a transfer case, with which the split axle mechanism is used in a part-time four-wheel drive vehicle comprising:
   an electro-thermal linear actuator mounted on the split axle mechanism and operatively connected to the clutch so that the clutch is biased toward disengagement when a first electric power means is fed to the linear actuator and biased toward engagement when a second electric power means is fed to the linear actuator,
   an electric switch mounted on the transfer case and operatively associated with the transfer case so that the switch has a first operative position where the first electric power means is fed to the electrical linear actuator when the transfer case is in a two-wheel drive mode and a second operative position where the second electric power means is fed to the electrical linear actuator when the transfer case is in a four-wheel drive mode, and said electro-thermal linear actuator having time delay means for delaying clutch engagement to a time after the transfer case is shifted to four-wheel drive and the second electric power means is fed to the electric linear actuator, so that the clutch parts are rotating in the same direction and four-wheel drive can be selected while the vehicle is in motion, said time delay means including an electrically powered heater and a phase changing working fluid in the electro-thermal linear actuator.

* * * * *